(12) United States Patent
Nichtawitz et al.

(10) Patent No.: US 7,025,564 B2
(45) Date of Patent: Apr. 11, 2006

(54) DEVICES AND METHODS FOR REDUCING OR ELIMINATING THE GAP BETWEEN A STAY VANE AND ITS CORRESPONDING WICKET GATE AS USED IN TURBINES

(75) Inventors: Alois Nichtawitz, Traun (AT); Karl C. Angerer, St. Martin im Muhlkreis (AT); Robert A. Davidson, Vicksburg, MS (US); Rodney J. Wittinger, Portland, OR (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 75 days.

(21) Appl. No.: 10/767,499

(22) Filed: Jan. 23, 2004

(65) Prior Publication Data
US 2004/0156709 A1 Aug. 12, 2004

Related U.S. Application Data

(60) Provisional application No. 60/442,551, filed on Jan. 27, 2003.

(51) Int. Cl.
*F03B 1/04* (2006.01)
(52) U.S. Cl. .................................. 415/163; 415/1
(58) Field of Classification Search ............ 415/151, 415/155, 160–166, 186, 208.4, 209.3, 1
See application file for complete search history.

(56) References Cited

U.S. PATENT DOCUMENTS

| 4,203,703 A | | 5/1980 | Koeller |
| 5,126,584 A | * | 6/1992 | Ouellet ..................... 290/55 |
| 5,207,558 A | * | 5/1993 | Hagle et al. ............... 415/161 |

(Continued)

OTHER PUBLICATIONS

U.S. Appl. No. 60/442,551, filed Jan. 27, 2003, Wittinger.

*Primary Examiner*—Edward K. Look
*Assistant Examiner*—Devin Hanan
(74) *Attorney, Agent, or Firm*—Earl H. Baugher, Jr.

(57) ABSTRACT

An improved design for turbines increases efficiency while reducing potential for fish kill. In an embodiment of the present invention as relates to Kaplan turbines, the gap between stay vanes and their corresponding wicket gates is reduced or eliminated by provision of an extension to the trailing edge of the stay vane. In alternative embodiments, the extension may be added to the wicket gate or affixed to both in an arrangement that permits free movement of the wicket gate. To facilitate eliminating the gap altogether, the extension may be made of a pliable material or be fabricated in a telescoping or accordion arrangement to permit contact with opposing parts without damage thereto. By designing extensions using accepted hydraulic principles, a better fit of the stay vane to its associated wicket gate, and possibly to the turbines runners may be effected, further improving operational efficiency and possibly even extending maintenance intervals.

52 Claims, 4 Drawing Sheets

U.S. PATENT DOCUMENTS

| | | |
|---|---|---|
| 5,209,632 A | 5/1993 | Ito |
| 5,228,830 A | 7/1993 | Pastore |
| 5,322,412 A | 6/1994 | Erlach |
| 5,441,384 A | 8/1995 | Gokhaman |
| 5,472,314 A * | 12/1995 | Delonge et al. ............ 415/156 |
| 5,780,935 A | 7/1998 | Kao |
| 5,896,657 A | 4/1999 | Beyer et al. |
| 5,924,842 A * | 7/1999 | Beyer et al. ................ 415/115 |
| 5,947,679 A | 9/1999 | Cybularz |
| 5,954,474 A | 9/1999 | Fisher et al. |
| 6,007,297 A * | 12/1999 | Buchelt ...................... 415/161 |
| 6,038,494 A | 3/2000 | Fisher et al. |
| 6,095,749 A | 8/2000 | Beyer et al. |
| 6,164,907 A | 12/2000 | Cybularz et al. |
| 6,247,893 B1 | 6/2001 | Beyer et al. |
| 6,254,339 B1 * | 7/2001 | Fisher et al. ............. 415/173.1 |
| 6,357,389 B1 | 3/2002 | March et al. |
| 6,402,477 B1 | 6/2002 | Cybularz et al. |
| 6,441,508 B1 | 8/2002 | Hylton |
| 6,533,536 B1 | 3/2003 | Fisher et al. |

* cited by examiner

DEVICES AND METHODS FOR REDUCING OR ELIMINATING THE GAP BETWEEN A STAY VANE AND ITS CORRESPONDING WICKET GATE AS USED IN TURBINES

RELATED APPLICATIONS

Under 35 U.S.C § 119(e)(1), this application claims the benefit of prior co-pending U.S. Provisional Patent Application Ser. No. 60/442,551, Devices and Methods for Reducing or Eliminating the Gap Between a Stay Vane and its Corresponding Wicket Gate as Used in Turbines, by Wittinger et al., filed Jan. 27, 2003, and incorporated herein by reference.

STATEMENT OF GOVERNMENT INTEREST

The United States Government has rights in this invention pursuant to U.S. Army Corp of Engineers Contract No. DACW 68-95-C0017 with VA TECH HYDRO GmbH & Co. This patent and related patents are available for licensing. Please contact Phillip Stewart at 601 634-4113 or Christian Weiss at 0043 1 89100 2752.

BACKGROUND

Hydropower generating systems, i.e., hydro-turbines, are dependent on a continuous source of water, generally drawn from an open source, such as an impoundment, river or lake. Water intake requirements amount to thousands of gallons per minute. Turbines used to transform the associated hydrostatic head into electric power are designed with cascades, each comprising a fixed stay vane and an adjustable valve, termed a wicket gate. The cascade, most often arranged in a circle about the turbine runners, directs the water flow into the turbine runner at the desired angle to optimize energy recovery. These cascades are placed in the penstock tube, i.e., the conduit used to transport water to the turbine. Typically there are 20 to 24 cascades for a large turbine. The cascades direct water to the runners of the turbine where the flow is converted to rotary turbine motion. The cascades provide regulation of the turbine by directing water into the turbine at a flow orientation and flow rate to meet a pre-specified demand. This regulation is achieved by adjusting the openings of the cascade to compensate as the hydrostatic head varies with changes in the environment. Further, the cascade modulates sudden flow surges when the turbine starts and stops.

These turbines are often provided as reversible pump-turbines, i.e., water motion may be converted to mechanical motion or vice versa. That is, the cascades are also capable of regulating the flow of water from the turbine runner back through the penstock tube. This is necessary when a sudden loss of power to the generator occurs and back-flow must be prevented.

During operation, the demand for water may vary between a maximum possible intake, to nearly no water within a short period. At high water flow rates the cascades may be plagued by erosion and pitting from cavitation. At low or no water flow, marine growth and corrosion result. These problems directly alter the surface profile of the cascades, resulting in a reduction in the effective water flow rate through the penstock tube to the turbine runners. Cascades are designed with shapes that permit optimized water flow with minimal turbulence. Because the wicket gates move and the stay vanes are fixed, conventionally, more attention is paid to addressing changes to the design of the wicket gates than the stay vanes. See, for example, U.S. Pat. No. 5,228,830, Wicket Gate, to Pastore, Jul. 20, 1993; U.S. Pat. No. 5,441,384, Hydraulic Turbine and Guide Gate Apparatus and Runner Apparatus Therefor, to Gokhaman, Aug. 15, 1995; and U.S. Pat. No. 4,203,703, Hydraulic Turbo Machine Wicket Gate Seals, to Koeller, May 20, 1980.

Erosion is the gradual wearing-away of a surface. Impinging particles carried along by rapidly moving water causes it. Pitting is caused by cavitation. Pitting occurs when gas-filled cavities, as may be created by structure vibration, collapse on the surface. This collapse imparts a pressure pulse of such magnitude that it removes small pieces of the surface. A pitted or eroded surface sets up turbulence and associated vibration, thereby accelerating damage. Means to prevent both corrosion and pitting include optimizing water flow to minimize particles impinging on surfaces of the cascade by improving the orientation of flow to reduce turbulence in the area of the entrance to the runners.

To optimize operation of a turbine, regular maintenance is done on the cascades. Due to their location, it is difficult to access them, requiring shutting down and sending divers into the penstock tube. The divers inspect, and, if possible, make repairs in situ. When in situ repairs are impossible, the wicket gates may be removed and brought to the water surface. Further, due to the dimensions and weight of the gates, they must be removed individually. The stay vanes are part of the structure, however, and require careful attention to remove and replace only some of them at a time. Because of the awkwardness of the retrieval operation, the gates or stay vanes are dragged through the tube, often resulting in damage to the removed structures, the penstock tube, or both. Thus, it is important, both operationally and fiscally, to minimize damage to the cascades and extend maintenance intervals wherever possible.

An approach to minimizing the effects of cavitation is through "hydro-dynamically shaping" turbine components, including the cascades. This increases the maximum flow rates while minimizing turbulence at the boundary between the turbine parts and the flowing water. As discussed above, the majority of effort has been to address the shape of only the wicket gates in conventional efforts at improving flow. Although these efforts have ameliorated the effects of erosion and cavitation, they have not eliminated them. Thus, periodic maintenance of the cascade components is still required. Design optimization techniques have included selection of the location of the turbine and control of the turbine operation. Changes in these parameters may result in a reduction in the effects of erosion and cavitation, but such a reduction often comes at the expense of the power-generating capacity of the hydroelectric unit. The net effect of such an effort is an extension of the maintenance lifecycle at the cost of a reduction in power output. An embodiment of the present invention not only has the potential for increasing required maintenance intervals but also increasing turbine output while reducing fauna (fish) casualties.

A conventional turbine-machinery stay vane is separated from its respective wicket gate by a "generous" clearance gap. Mainly due to hydraulic shear and cross flow between stay vane and wicket gate, waterborne fauna may be severely injured or killed when passing through the turbine. Thus, an embodiment of the present invention also has the potential for reducing fauna (fish) casualties.

Conventional design practice does not identify the size of this clearance gap. The immobile stay vanes are structural members used to hold the superstructure in place and transfer the building and operating loads to the main civil structure. Thus, it is advantageous to provide these structural members with a provision for replacement of sections of the structure (stay vane) that are susceptible to wear or amenable to modification due to an improvement in other components of the turbine, such as the wicket gates or turbine runners. A wicket gate is the removable and movable component of the cascade, thus it is not as important to provide separate removable pieces for it. The wicket gate permits real time adjustment of the cascade to meet operating requirements, whereas the design of the stay vane must be judiciously selected to "cooperate" with the other components of the turbine. This "cooperation" is based on the projected entire operating cycle of the turbine, including an option to be altered readily to "cooperate" with modifications to other components of that turbine over its projected life. Basic machine parameters, such as overall civil constraints, head, power and flow, determine the radial location, number and size of the wicket gates and stay vanes. An embodiment of the present invention addresses the option to alter stay vanes even though they are part of supporting structure.

SUMMARY

In an embodiment of the present invention, a modified stay vane is provided for use with a turbine. The stay vane has a leading edge and a trailing edge with respect to a fluid inlet to the turbine and structurally supports the turbine. In an embodiment of the present invention the stay vane is modified with an extension affixed to the trailing edge of the stay vane, such that the modified stay vane reduces the gap between the stay vane and its associated wicket gate. This improves hydraulic performance of the turbine configuration by "hydraulically complementing" at least the modified stay vane's corresponding wicket gate and possibly the turbine runners also. In addition to increased operating efficiency, the reduced gap has other beneficial consequences including reduced casualties among fish that may be passing through the turbine. The gap may be reduced in the range of 25% of its initial value, and preferably by 50–100% of its initial value.

In an embodiment of the present invention, the extension is affixed to the trailing edge of the stay vane mechanically, such as by a bolt threadably connected to a tapped borehole provided in the existing stay vane. The borehole may be countersunk and the portion above the bolt head (as installed) filled with a suitable sealant that may be any of: an auto-body filler, an RTV sealant, an epoxy, and any combination thereof. The bolt may also be threadably connected to a threaded insert provided in the borehole (which may be countersunk) in the trailing edge of the existing stay vane and, if countersunk, covered as above with sealant.

As an alternative embodiment, the extension may also be permanently affixed to the stay vane, for example by welding, soldering or chemically bonding.

In another embodiment of the present invention, the trailing edge of the extension touches the wicket gate thus closing the gap between stay vane and corresponding wicket gate, at least for certain positions of the wicket gate. In yet another embodiment, the extension from the stay vane is affixed to the wicket gate thus closing the gap for all possible wicket gate positions. For either of these embodiments that completely close or eliminate the gap, the extension is advantageously made of a durable pliable, flexible or elastic material or comprises a telescoping, or accordion, arrangement. Such an embodiment further reduces or even eliminates the negative effects of the gap between stay vane and wicket gate. Of course, in yet another embodiment an extension of flexible material as described for insertion between the wicket gate and its corresponding stay vane may be attached only to the wicket gate and close the gap for certain positions of the wicket gate in a manner similar to the flexible extension attached to the stay vane only.

Also included as an embodiment of the present invention is a hydraulic turbine configuration incorporating the above alternative extensions to the stay vane and the extension itself.

Further, a method of improving operation of a turbine configuration incorporating stay vanes, wicket gates, and turbine runners is also provided. The method also has potential for reducing casualties among fauna passing through the turbine configuration. The method involves: designing an extension for the stay vanes that hydraulically complements at least said stay vanes and affixing the extension to the stay vanes, so that the extension reduces the width of any gap between a trailing edge of each stay vane and its corresponding wicket gate, thus improving operation of the turbine configuration. The method further provides a design for the extension that hydraulically complements the turbine runners of the turbine configuration. The method may provide that the extension reduces the width of the gap or closes the gap between the stay vanes and the wicket gates by an amount of at least 25%, and preferably from about 50–100% of the gap before installation of the extension.

In an embodiment of the present invention, a fixed, yet removable, extension is attached mechanically to the trailing edge of installed stay vanes to reduce the clearance between the stay vane and its corresponding wicket gate. The extension shape is hydraulically optimized, i.e., hydro-dynamically shaped to complement either the existing or modified wicket gates. The resultant smaller clearance reduces leakage, turbulence, cross flow, hydraulic shear and vortices between each wicket gate and its stay vane. The extension is attached to each existing stay vane and may be removable to facilitate maintenance or upgrades to the turbine, e.g., disassembly of the structure with potential for reducing the need to alter structure, e.g., the stay vane itself, during routine maintenance. Further, by reducing gap leakage, potential for casualty to fish passing near or through the previous "generous" gap is lessened. Advantages of embodiments of the present invention include:

improves boundary layer conditions by reducing the leakage gap and reduces hydraulic losses thus optimizing flow distribution through the cascade to enable a smooth transition of water flow to the runner thus increasing turbine efficiency over most of its operating range;

reduces shear and turbulence, thus minimizing fish casualties; and provides a non-structural device that mechanically attaches to permit ready installation for upgrades (such as may be needed to match cascades to new runner designs) and easy removal during disassembly of the machine for maintenance.

DETAILED DESCRIPTION

Figure 1A:
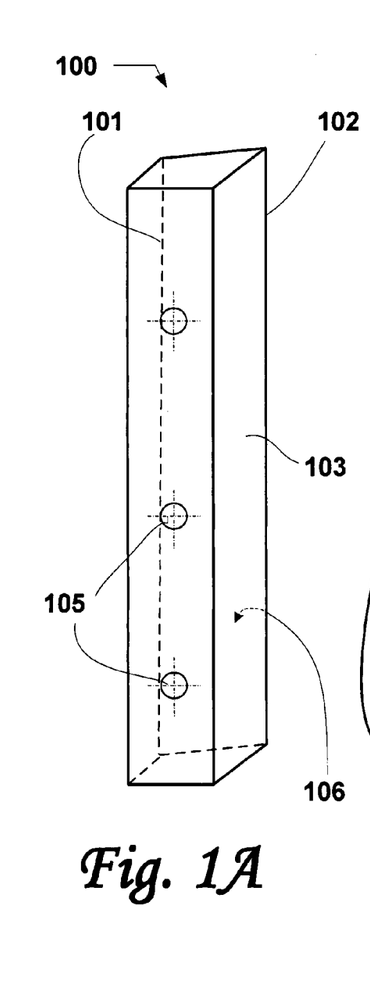
FIG. 1A is an end profile of an embodiment of the present invention.
Figure 1B:
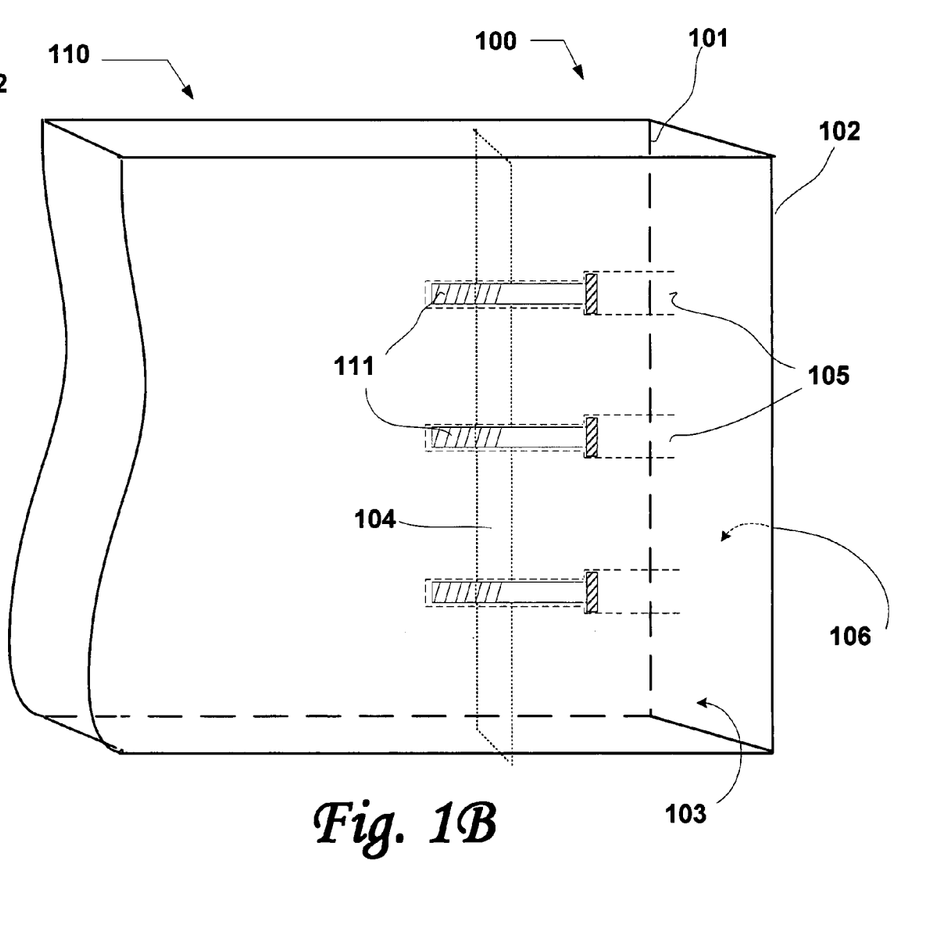
FIG. 1B is side profile of an embodiment of the present invention as installed on the trailing edge of a stay vane.

Refer to FIGS. 1A and 1B. An extension 100 is designed to meet pre-specified hydrodynamic requirements for use with a specific configuration of turbine runners and cascades, i.e., stay vanes and associated wicket gates in a turbine. The extension 100, representing an embodiment of the present invention, is added to a stay vane 110 at the trailing edge 104. To facilitate orientation of the reader, sides 103, 106 and edges 101, 102 of the extension are labeled in both FIGS. 1A and 1B. Although the extension 100 is shown with four sides with none of the sides having dimensions equal to its opposing side, the extension may be provided in any of a number of configurations, including a continuous arc with no corners.

Using countersunk bores 105, the extension 100 is attached mechanically to the trailing end 104 via suitable connectors 111, here shown as three bolts threaded in a tapped borehole, but also possibly threaded into threaded inserts (not shown separately) affixed in the trailing edge 104. An epoxy, RTV sealant, or other suitable sealant may be used to seal the hole (countersunk bore 105) above the countersunk head of the connector 111.

Figure 2A:
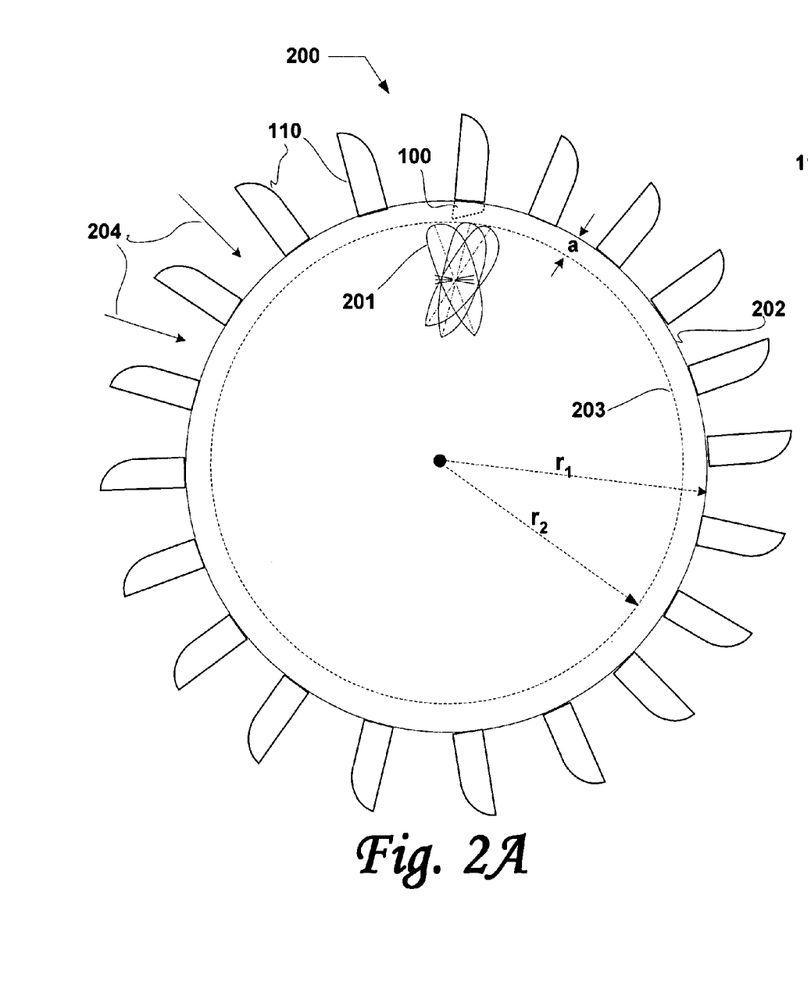
FIG. 2A is a top view of a configuration of installed stay vanes having one stay vane modified in accordance with an embodiment of the present invention as shown in relation to its associated wicket gate.
Figure 2B:
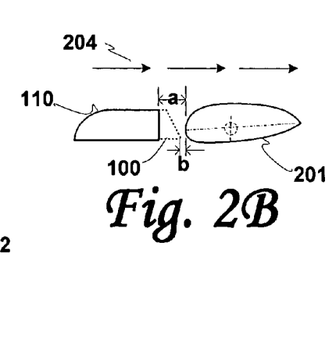
FIG. 2B is a top view of a stay vane incorporating an embodiment of the present invention, in relation to its associated wicket gate in the fully open position.
Figure 2C:
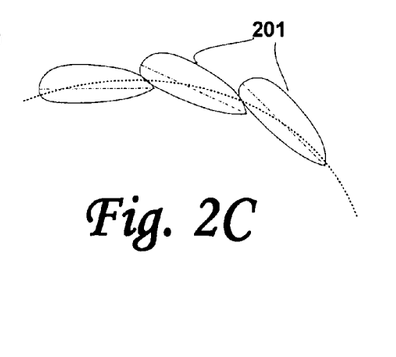
FIG. 2C is a top view of wicket gates in a fully closed position that may be used with an embodiment of the present invention.

Refer to FIGS. 2A, 2B, and 2C. FIG. 2A is a top view of an arrangement 200 of 20 stay vanes 110 as they may be disposed about a turbine impeller (not shown separately). For clarity of presentation, only one of the stay vanes 110 is shown incorporating an extension 100 that is an embodiment of the present invention. Also shown at that stay vane 110 with extension 100 is a typical wicket gate 201, depicted as being capable of movement in a plane lying in the paper.

Water enters the configuration 200 between the stay vanes 110 and through at least partially opened wicket gates 201 as depicted at the arrows 204. A top view of a single modified cascade (stay vane 110 with extension 100 and wicket gate 201) is shown in FIG. 2B, clearly showing at the arrows 204 how water from a radial intake (not shown separately) flows past the cascade when the wicket gate 201 is fully open. FIG. 2C shows three wicket gates 201 in the closed position for comparison. As stated previously, stay vanes 110, including those with extensions 100, are immobile.

Refer again to FIGS. 2A and 2B. Stay vanes 110 without extensions 100 of an embodiment of the present invention abut a circle 202 defined at a radius, $r_1$, whereas stay vanes 110 with extensions 100 abut a circle 203 defined at a radius, $r_2$, where $r_2$ is clearly less than $r_1$. The "generous gap," shown as a, between the stay vane 110 without extension 100 and the wicket gate 201 is much larger than the gap, shown as b, between the stay vane 110 with extension 100 and its associated wicket gate 201. Narrowing this gap in the range of 50–100% of the initial gap and providing a "hydrodynamically enhanced" shape for the extension 100, provides significant improvements as discussed above. For example, tests indicate turbine efficiency is increased an average of 0.5% throughout the operating range of the turbine. Other expected benefits include longer mean times to first maintenance actions associated with the cascades and reduced fauna (fish) casualty.

Although an embodiment of the invention is described with respect to an extension 100 that may be added to existing designs, it is understood that new stay vanes 110 may be made as part of the structure to hold new turbines while incorporating a "hydro-dynamically enhanced" trailing edge and be installed with a reduced gap (from that of conventional designs) between the trailing edge 104 and the wicket gate 201 and fall within the ambit of the present invention.

Figure 3A:
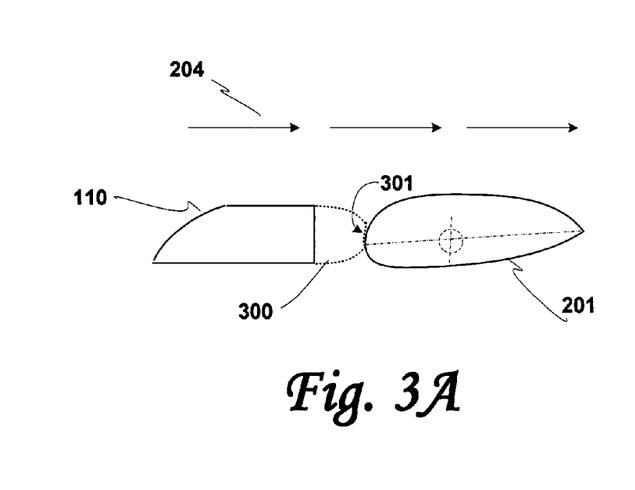
FIG. 3A is a top view of a stay vane incorporating another embodiment of the present invention, a flexible extension, in relation to its associated wicket gate in the fully open position.
Figure 3B:
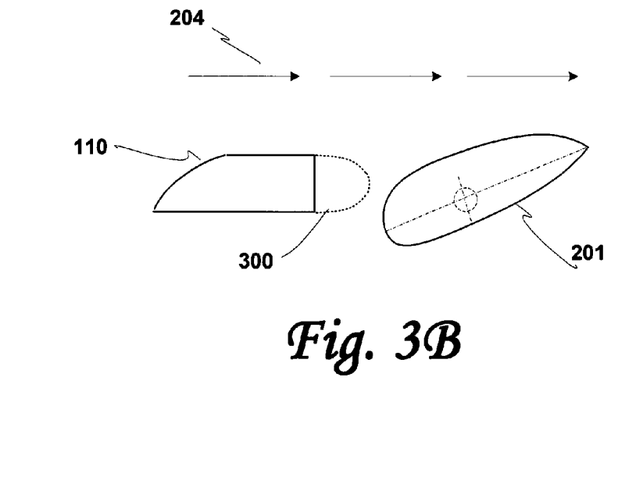
FIG. 3B is a top view of a stay vane incorporating another embodiment of the present invention, a flexible extension, in relation to its associated wicket gate in the partially open position in which the extension does not touch the wicket gate.
Figure 4A:
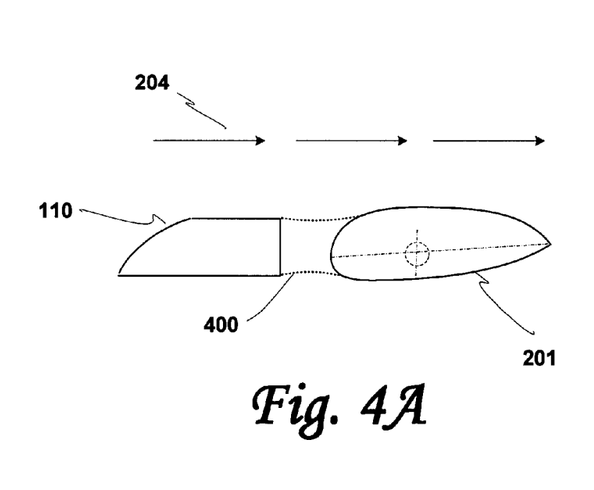
FIG. 4A is a top view of a stay vane incorporating another embodiment of the present invention, a flexible extension attached to both the stay vane and the wicket gate, in relation to its associated wicket gate in the fully open position.
Figure 4B:
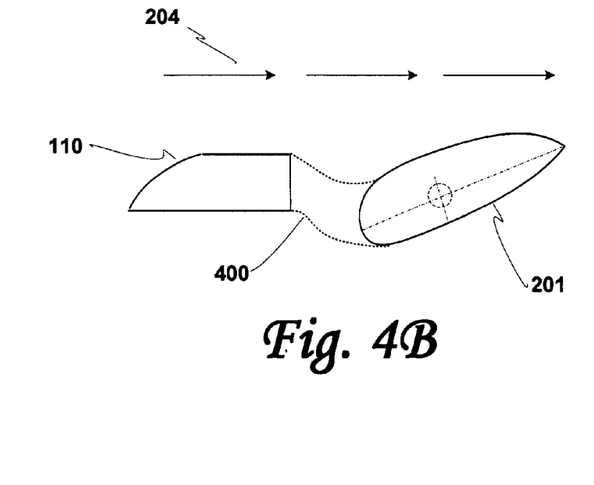
FIG. 4B is a top view of a stay vane incorporating another embodiment of the present invention, a flexible extension attached to both the stay vane and the wicket gate, in relation to its associated wicket gate in the partially open position.
Figure 5A:
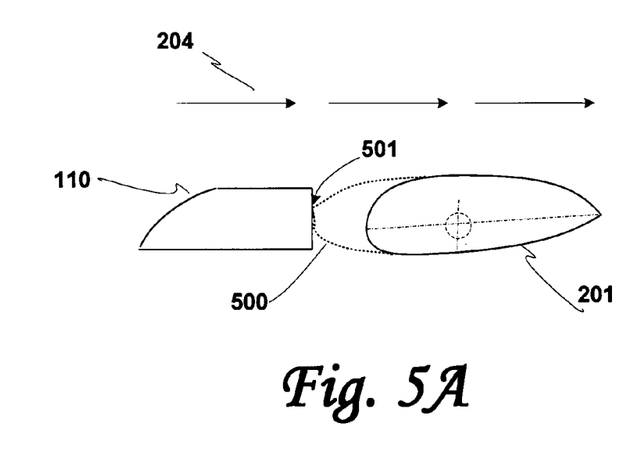
FIG. 5A is a top view of a stay vane incorporating another embodiment of the present invention, a flexible extension attached to the wicket gate, in relation to its associated wicket gate in the fully open position.
Figure 5B:
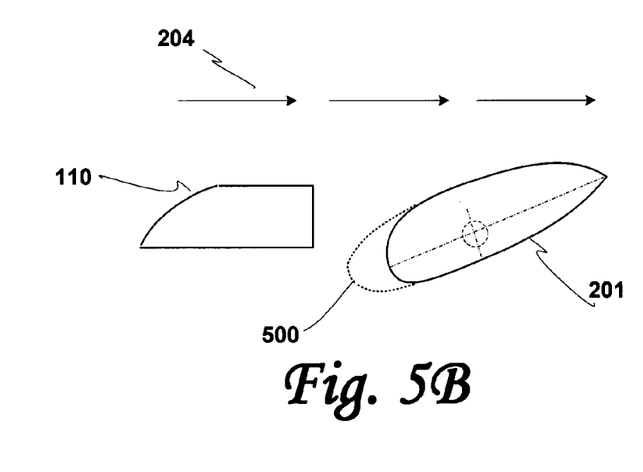
FIG. 5B is a top view of a stay vane incorporating another embodiment of the present invention, a flexible extension attached to the wicket gate, in relation to its associated wicket gate in the partially open position.

Other embodiments of the present invention are schematically depicted in FIGS. 3, 4 and 5. These are top views of a single cascade, comprising a stay vane 110 with extension 300, 400, 500 and wicket gate 201.

In the embodiment of FIG. 3A the extension 100 is attached, e.g. bonded, to the trailing edge of the stay vane 110 and is made of a durable flexible or elastic material, e.g., rubber, silicon, or other suitable pliable synthetic material or may comprise a telescoping or accordion arrangement to allow flexion without undue wear of the material. The trailing edge of the extension 300 is in touch 301 with the wicket gate 201, thus closing the gap between the stay vane 110 and the wicket gate 201. The extension 300 preferably functions similar to a sealing lip, and it is pressed against the wicket gate 201 by elastic forces caused by the deformation of the durable flexible extension 300. Because of the flexibility of this pliable extension 300, the gap is completely eliminated over a certain (limited) number of positions of the wicket gate 201. In case that the wicket gates 201 are closed as in FIG. 2C or partially open as in FIG. 3B, the flexible extension 300 still ameliorates water flow past the cascade, just like the inflexible extension 100 as shown in FIGS. 1 and 2.

In yet another embodiment, shown in FIG. 4A for the fully open position of the wicket gate 201, the extension 400 is affixed, e.g. chemically bonded or mechanically affixed, to the trailing edge of the stay vane 110 and to the leading edge of the wicket gate 201. This arrangement eliminates the gap between stay vane 110 and wicket gate 201 for all possible positions of the wicket gate 201, as shown in FIG. 4B. To this end the extension 400 is preferably again made of a flexible material or fabricated in a telescoping or accordion arrangement.

Refer to FIG. 5. In a manner similar to the flexible extension 300 of FIG. 3, another embodiment envisions a flexible extension 500, affixed to the wicket gate 201 only, touching 501 in selected positions of the stay vane 110 that are near the fully open position and not touching as depicted in FIG. 5B when the wicket gate 201 is partially open or fully closed.

The extension 300, 400, 500 of the embodiments of FIGS. 3, 4 and 5 may be removable, e.g. as described above, or permanently affixed to the stay vane 110 or wicket gate 201 respectively, e.g., by chemical bonding.

While the invention has been described in terms of one or more embodiments, those skilled in the art will recognize that the invention may be practiced with modifications within the spirit and scope of the appended claims. For example, although the system is described in specific examples for large hydro-turbines it will operate equally well with scaled-down systems. Thus, it is intended that all matter contained in the foregoing description or shown in the accompanying drawings shall be interpreted as illustrative rather than limiting, and the invention should be defined only in accordance with the following claims and their equivalents.

We claim:

1. A stay vane for use with a turbine configuration having components including a complementary component incorporating a leading edge and a trailing edge, said complementary component suitable for complementing operation of said stay vane, comprising:

a first structure, incorporating a leading edge and a trailing edge with respect to a fluid inlet to said turbine configuration, wherein said first structure supports said turbine configuration at least in part; and an extension affixed to said trailing edge of said first structure, wherein said extension improves hydraulic performance of said turbine configuration by reducing, but not sealing, the gap between said stay vane and said complementary component.

2. The stay vane of claim 1 further comprising at least one connector for affixing said extension to said trailing edge of said first structure.

3. The stay vane of claim 2 in which said at least one connector is a bolt threadably connected to a tapped borehole provided in said first structure as at least one of said components of said turbine configuration.

4. The stay vane of claim 3 in which said borehole is countersunk and the portion above said bolt as installed is filled with a sealant selected from the group consisting of: an auto body filler, an RTV sealant, an epoxy, and any combination thereof.

5. The stay vane of claim 2 in which said at least one connector is a bolt threadably connected to a threaded insert provided in a borehole in said first structure at least one of said components of said turbine configuration.

6. The stay vane of claim 5 in which said borehole is countersunk and the portion above said bolt as installed is filled with a sealant selected from the group consisting of: an auto body filler, an RTV sealant, an epoxy, and any combination thereof.

7. The stay vane of claim 1 in which said extension is affixed to said trailing edge of said first structure by any of a means selected from the group consisting essentially of: welding, soldering, mechanically bonding, chemically bonding, and combinations thereof.

8. The stay vane of claim 1 in which said complementary component is a wicket gate, incorporating a leading edge and a trailing edge with respect to a fluid inlet to said turbine configuration.

9. The stay vane of claim 8 in which said extension is permitted to touch said wicket gate in the region of said leading edge of said wicket gate, thereby eliminating the gap between said second structure and said wicket gate in at least one position of said wicket gate.

10. The stay vane of claim 9 in which said extension is also affixed to said leading edge of said wicket gate.

11. The stay vane of claim 10 in which said extension is fabricated from a material selected from the group consisting of: a durable elastic material, a durable flexible material, a durable pliable material, a durable material formed in a telescoping arrangement, a durable material formed in an accordion arrangement, and any combination thereof.

12. The stay vane of claim 9 in which said extension is fabricated from a material selected from the group consisting of: a durable elastic material, a durable flexible material, a durable pliable material, a durable material formed in a telescoping arrangement, a durable material formed in an accordion arrangement, and any combination thereof.

13. A hydraulic turbine configuration having components, including at least one wicket gate, at least one stay vane and at least one turbine runner, said stay vane comprising:

a first structure, incorporating a leading edge and a trailing edge with respect to a water inlet to said hydraulic turbine configuration, wherein said first structure supports said turbine configuration at least in part; and a second structure affixed to said trailing edge of said, first structure, wherein said second structure improves hydraulic performance of said turbine configuration by reducing, but not sealing, the gap between said stay vane and said wicket gate.

14. The hydraulic turbine configuration of claim 13 further comprising at least one connector for affixing said second structure to said trailing edge of said first structure.

15. The hydraulic turbine configuration of claim 14 in which said at least one connector is a bolt threadably connected to a tapped borehole provided in said first structure as at least one of said components of said turbine configuration.

16. The hydraulic turbine configuration of claim 15 in which said borehole is countersunk and the portion above said bolt as installed is filled with a sealant selected from the group consisting of: an auto body filler, an RTV sealant, an epoxy, and any combination thereof.

17. The hydraulic turbine configuration of claim 15 in which said at least one connector is a bolt threadably connected to a threaded insert provided in a borehole in said first structure as at least one of said components of said turbine configuration.

18. The hydraulic turbine configuration of claim 17 in which said borehole is countersunk and the portion above said bolt as installed is filled with a sealant selected from the group consisting of: an auto body filler, an RTV sealant, an epoxy, and any combination thereof.

19. The hydraulic turbine configuration of claim 13 in which said second structure is affixed to said first structure by any method selected from the group consisting of: welding, soldering, mechanically bonding, chemically bonding, and combinations thereof.

20. The hydraulic turbine configuration of claim 13 in which said second structure touches said at least one wicket gate in the region of said leading edge of said wicket gate, thereby eliminating said gap between said second structure and said wicket gate in at least one position of said wicket gate.

21. The hydraulic turbine configuration of claim 20 in which said second structure is also affixed to said leading edge of said at least one wicket gate.

22. The hydraulic turbine configuration of claim 21 in which said second structure is fabricated from a material selected from the group consisting of: a durable elastic material, a durable flexible material, a durable pliable material, a durable material formed in a telescoping arrangement, a durable material formed in an accordion arrangement, and any combination thereof.

23. The hydraulic turbine configuration of claim 20 in which said second structure is fabricated from a material selected from the group consisting of: a durable elastic material, a durable flexible material, a durable pliable material, a durable material formed in a telescoping arrangement, a durable material formed in an accordion arrangement, and any combination thereof.

24. An extension incorporated in a turbine configuration having components to include a first structure supporting said turbine configuration at least in part, said first structure incorporating a leading edge and a trailing edge with respect to a fluid inlet to said turbine configuration, and at least a complementary component to said first structure, said extension comprising:
a second structure affixed to said trailing edge of said first structure,
wherein said extension improves hydraulic performance of said turbine configuration by reducing, but not sealing, the gap between said first structure and said complementary component.

25. The extension of claim 24 further comprising at least one connector for affixing said to said trailing edge of said first structure.

26. The extension of claim 25 in which said at least one connector is a bolt threadably connected to a tapped borehole provided in said first structure as at least one of said components of said turbine configuration.

27. The extension of claim 26 in which said borehole is countersunk and the portion above said bolt as installed is filled with a sealant selected from the group consisting of: an auto body filler, an RTV sealant, an epoxy, and any combination thereof.

28. The extension of claim 24 in which said second structure is affixed to said first structure by any method selected from the group consisting of: welding, soldering, mechanically bonding, chemically bonding, and combinations thereof.

29. The extension of claim 25 in which said at least one connector is a bolt threadably connected to a threaded insert provided in a borehole in said first structure as at least one of said components of said turbine configuration.

30. The extension of claim 29 in which said borehole is countersunk and the portion above said bolt as installed is filled with a sealant selected from the group consisting of: an auto body filler, an RTV sealant, an epoxy, and any combination thereof.

31. The extension of claim 24 in which said complementary component is at least one wicket gate incorporating a leading edge and a trailing edge with respect to a fluid inlet to said turbine configuration.

32. The extension of claim 31 in which said second structure touches said at least one wicket gate in the region of said leading edge of said wicket gate in at least one position of said wicket gate relative to said stay vane, thereby eliminating said gap between said second structure and said wicket gate at said at least one position.

33. The extension of claim 32 in which said second structure is also affixed to said leading edge of said at least one wicket gate.

34. The extension of claim 33 in which said second structure is fabricated from a material selected from the group consisting of: a durable elastic material, a durable flexible material, a durable pliable material, a durable material formed in a telescoping arrangement, a durable material formed in an accordion arrangement, and any combination thereof.

35. The extension of claim 32 in which said second structure is fabricated from a material selected from the group consisting of: a durable elastic material, a durable flexible material, a durable pliable material, a durable material formed in a telescoping arrangement, a durable material formed in an accordion arrangement, and any combination thereof.

36. A method of improving operation of a turbine configuration at least incorporating stay vanes having a leading edge and a trailing edge with respect to a fluid inlet to said turbine configuration, wicket gates, and turbine runners, said method also having potential for reducing casualties among fauna passing through said turbine configuration, comprising:
designing an extension for said stay vanes that hydraulically complements at least said wicket gates; and
affixing said extension to said stay vanes,
wherein said extension reduces the width of any gap between a trailing edge of each said stay vane and a leading edge of a corresponding said wicket gate.

37. The method of claim 36 providing for said extension to touch said wicket gate corresponding to said stay vane when said wicket gate is fully open.

38. The method of claim 36 further comprising affixing said extension to said wicket gate corresponding to said stay vane.

39. The method of claim 36 further designing said extension to complement said turbine runners.

40. The method of claim 36 providing for said extension to reduce the width of said gap between said stay vanes and said wicket gates by an amount from about 25–100% of said gap before installation of said extension.

41. A wicket gate for use with a turbine configuration, said turbine configuration having components, including at least one complemented component, comprising:
a first structure, incorporating a leading edge and a trailing edge with respect to a fluid inlet to said turbine configuration,
wherein said first structure pivots about an axis to control water flow through said turbine; and
a second structure affixed to said leading edge of said first structure,
wherein said second structure improves hydraulic performance of said turbine configuration by complementing at least one said component of said turbine configuration.

42. The wicket gate of claim 41 in which said second structure is affixed to said leading edge of said first structure in a manner selected from the group consisting essentially of: welding, soldering, mechanically bonding, chemically bonding, and combinations thereof.

43. The wicket gate of claim 41 in which said at least one complemented component is at least one stay vane, incorporating a leading edge and a trailing edge with respect to a fluid inlet to said turbine configuration.

44. The wicket gate of claim 43 in which said second structure is permitted to touch said at least one stay vane in at least one position of said at least one wicket gate relative to said stay vane, thereby eliminating the gap between said second structure and said stay vane.

45. The wicket gate of claim 44 in which said second structure is also affixed to said trailing edge of said at least one stay vane.

46. The wicket gate of claim 45 in which said second structure is fabricated from a material selected from the group consisting of: a durable elastic material, a durable flexible material, a durable pliable material, a durable material formed in a telescoping arrangement, a durable material formed in an accordion arrangement, and any combination thereof.

47. The wicket gate of claim 44 in which said second structure is fabricated from a material selected from the group consisting of: a durable elastic material, a durable flexible material, a durable pliable material, a durable material formed in a telescoping arrangement, a durable material formed in an accordion arrangement, and any combination thereof.

48. An extension incorporated in a turbine configuration having components to include a first structure supporting said turbine configuration at least in part, said first structure incorporating a leading edge and a trailing edge with respect to a fluid inlet to said turbine configuration, said extension comprising:

a second structure affixed to said leading edge of said first structure, wherein said extension improves hydraulic performance of said turbine configuration by complementing at least one said components of said turbine configuration.

49. The extension of claim 48 in which said second structure is affixed to said first structure by any method selected from the group consisting of: welding, soldering, mechanically bonding, chemically bonding, and combinations thereof.

50. The extension of claim 48 in which said at least one complemented component is at least one stay vane incorporating a leading edge and a trailing edge with respect to a fluid inlet to said turbine configuration.

51. The extension of claim 48 in which said second structure touches said at least one stay vane in at least one position of said wicket gate relative to said stay vane in the region of said trailing edge of said stay vane, thereby eliminating said gap between said second structure and said stay vane.

52. The extension of claim 48 in which said second structure is fabricated from a material selected from the group consisting of: a durable elastic material, a durable flexible material, a durable pliable material, a durable material formed in a telescoping arrangement, a durable material formed in an accordion arrangement, and any combination thereof.

\* \* \* \* \*